United States Patent
Wang et al.

(10) Patent No.: US 11,772,341 B2
(45) Date of Patent: Oct. 3, 2023

(54) DYEABLE 1.74 RESIN LENS AND PREPARATION METHOD THEREOF

(71) Applicants: Jiangsu Conant Optical Co., Ltd., Nantong (CN); Shanghai Conant Optical Co., Ltd., Shanghai (CN)

(72) Inventors: Chuanbao Wang, Nantong (CN); Xinbiao Liu, Nantong (CN); Qiu Du, Nantong (CN); Yulei Bao, Nantong (CN); Yuan Lu, Nantong (CN); Qingbo Yan, Nantong (CN); Jian Huang, Nantong (CN)

(73) Assignees: Jiangsu Conant Optical Co., Ltd., Nantong (CN); Shanghai Conant Optical Co., Ltd., Shanghai (CN)

( * ) Notice: Subject to any disclaimer, the term of this patent is extended or adjusted under 35 U.S.C. 154(b) by 200 days.

(21) Appl. No.: 17/334,955

(22) Filed: May 31, 2021

(65) Prior Publication Data
US 2022/0317336 A1    Oct. 6, 2022

(30) Foreign Application Priority Data
Apr. 1, 2021   (CN) .......................... 202110356100.8

(51) Int. Cl.
| | | |
|---|---|---|
| *B29D 11/00* | (2006.01) | |
| *C08G 75/14* | (2006.01) | |
| *C08K 5/3475* | (2006.01) | |
| *G02B 1/04* | (2006.01) | |
| *B29K 81/00* | (2006.01) | |
| *B29K 105/00* | (2006.01) | |

(52) U.S. Cl.
CPC .... *B29D 11/0048* (2013.01); *B29D 11/00442* (2013.01); *C08G 75/14* (2013.01); *C08K 5/3475* (2013.01); *G02B 1/041* (2013.01); *B29K 2081/04* (2013.01); *B29K 2105/0002* (2013.01); *B29K 2995/002* (2013.01)

(58) Field of Classification Search
CPC ...... G02B 1/041; C08G 75/14; C08K 5/3475; B29D 11/00442; B29D 11/0048
See application file for complete search history.

(56) References Cited

U.S. PATENT DOCUMENTS

2004/0188873 A1\* 9/2004 Ono ................ B29D 11/00528
264/1.32

FOREIGN PATENT DOCUMENTS

CN   100495123   \*   6/2009

\* cited by examiner

*Primary Examiner* — Mathieu D Vargot
(74) *Attorney, Agent, or Firm* — CBM PATENT CONSULTING, LLC

(57) ABSTRACT

The present invention discloses a dyeable 1.74 resin lens and a preparation method thereof. The resin lens includes a module layer with a refractive index being 1.74, a dyeable layer with a refractive index being 1.60 is poured on an upper surface of the module layer, an upward curved degree of the dyeable layer is the same as an upward curved degree of the module layer, and a center thickness of the dyeable layer is 0.5-1.2 mm. According to the dyeable 1.74 resin lens of the present invention, a layer of dyeable 1.60plus resin lens is attached to a surface of a 1.74 lens, dyeing performance is good, a visible light transmittance can reach 10-30%, and the blank that the 1.74 lens cannot be dyed is filled.

6 Claims, No Drawings

DYEABLE 1.74 RESIN LENS AND PREPARATION METHOD THEREOF

TECHNICAL FIELD

The present invention belongs to the field of a resin lens, and more particularly relates to a dyeable 1.74 resin lens and a preparation method thereof.

RELATED ART

A resin lens has the advantages of light weight, good impact resistance, good light transmittance, low cost and the like, and can also meet special requirements, such as improvement of dyeing performance, color change performance, blue light prevention performance and the like. Sunglasses, also known as sun-shading glasses, have a sun-shading effect. Under sunlight, people usually adjust the pupil size to adjust the luminous flux, and when the light ray intensity exceeds the human eye adjustment ability, harm will be caused on the human eyes. Therefore, in outdoor activity places, especially in summer, many people use sun-shading glasses to shade sunlight so as to reduce fatigue caused by eye adjustment or harm caused by strong light stimulation. At present, the Japanese Mitsui 1.74 lens has the highest refractive index all over the world. Due to the particularity of production raw materials and processes, the 1.74 resin lens has a high polymerization degree and a great molecular weight, which makes it hardly dyeable.

SUMMARY

The objective of the present invention is to provide a dyeable 1.74 resin lens and disclose a preparation method of the dyeable resin lens by aiming at the above defects, so that the 1.74 resin lens can be subjected to dyeing treatment, and a visible light transmittance can reach 15-30%.

The present invention is realized by the following technical solution:

A dyeable 1.74 resin lens includes a module layer with a refractive index being 1.74, a dyeable layer with a refractive index being 1.60 is poured on an upper surface of the module layer, an upward curved degree of the dyeable layer is the same as an upward curved degree of the module layer, and a center thickness of the dyeable layer is 0.5-1.2 mm, and preferably 0.6-1.0 mm.

Preferably, a surface of the module layer of the resin lens is subjected to alkali treatment so as to improve adhesion between two lens layers.

A preparation method of the dyeable 1.74 resin lens includes the following steps:

(1) preparing a module layer resin lens with a refractive index being 1.74;
(2) soaking the prepared module layer in a NaOH solution to be treated, and then performing cleaning and drying;
(3) using the treated module layer as a lower mold and a glass mold as an upper mold to perform mold closing; and
(4) injecting raw materials of a dyeable layer with the refractive index being 1.60 into the mold subjected to mold closing, and then performing curing to obtain the dyeable resin lens.

In the preparation method, the module layer with the refractive index being 1.74 in step (1) includes the following ingredients:

100 weight parts of a resin monomer A material, 10 weight parts of a resin monomer B material, 0.06-0.11 weight part of an initiator, 0.2-0.3 weight part of an ultraviolet absorber, 0.002 weight part of a blue color agent and 0.014 weight part of a red color agent, wherein the resin monomer A material is bis(2,3-epithiopropyl)disulfide, and the resin monomer B material is bis(mercaptomethyl)-3,6,9-trithiaundecan-1,11-dithiol.

Preferably, the initiator is a mixture of N,N-diethylmethylamine and N,N-dimethylcyclohexylamine, and a mass ratio is 0.01-0.03:0.05-0.08.

Preferably, the ultraviolet absorber is one or more of 2-(2H-benzotriazole-2-yl)-6-(1-methyl-1-phenylethyl)-4-(1,1,3,3-tetramethylbutyl)phenol, 2'-(2'-hydroxy-3'-tert-butyl-5'-methylphenyl)-5-chlorobenzotriazole and 2-(2'-hydroxy-5'-tert-octylphenyl)benzotriazole.

Preferably, curing curves in the preparation of the module layer resin lens are as follows:

primary curing: performing heat insulation at 15-18° C. for 10-15 h; raising the temperature to 30° C. in 1 h, and performing heat insulation for 3-5 h; and raising the temperature to 110° C. in 8-10 h, performing heat insulation for 2 h, and performing cooling to reach 40° C. in 1.5 h, wherein a speed is constant in the temperature raising and lowering processes; and secondary curing: performing heat insulation at 120° C. for 3 h.

In the preparation method, the dyeable layer with the refractive index being 1.60 in step (4) includes the following ingredients:

100 weight parts of resin monomers, 0.03-0.06 weight part of an initiator and 0.01-0.03 weight part of an ultraviolet absorber, wherein the resin monomer is a mixture of 2,5 (or 2,6)-bis(isocyanatomethyl)-bicyclo[2.2.1]heptane, hexamethylene diisocyanate, pentaerythritol tetra(3-mercaptopropionate) and 4-mercaptomethyl-3,6-dithia-1,8-octanedithiol, and a mass ratio is 30:20:27:23.

Preferably, the initiator is dimethyltin dichloride.

Preferably, the ultraviolet absorber is one or more of 2-(2H-benzotriazole-2-yl)-6-(1-methyl-1-phenylethyl)-4-(1,1,3,3-tetramethylbutyl)phenol, 2'-(2'-hydroxy-3'-tert-butyl-5'-methylphenyl)-5-chlorobenzotriazole and 2-(2'-hydroxy-5'-tert-octylphenyl)benzotriazole.

Preferably, a specific weight of the NaOH solution in step (2) is 1.15-1.25, the soaking time is 3-15 min, the temperature is 60-80° C., ultrasonic treatment is performed during soaking, and an ultrasonic wave intensity is 5-15 w/cm$^2$.

Preferably, curing curves of curing in step (4) are as follows:

primary curing: performing heat insulation at 20-22° C. for 4-5 h; raising the temperature to 60° C. in 5-6 h; raising the temperature to 90° C. in 3-4 h, and raising the temperature to 100° C. in 0.5 h; and raising the temperature to 120° C. in 1-2 h, performing heat insulation for 4-5 h, and performing cooling to reach 80° C. in 1 h, wherein a speed is constant in the temperature raising and lowering processes; and secondary curing: performing heat insulation at 120° C. for 2 h.

After the above preparation steps are completed, a pigment proportion ratio in a dyeing tank can be adjusted according to the color of a final sample lens of a dyed lens, the above lens is dyed, a dyeing temperature is 80-95° C., and soaking time is 0.5-2.0 h; and then, color fixation is performed, a color fixation temperature is 90-120° C., and maintenance time is 3.5 h.

Compared to the prior art, the present invention has the following beneficial effects:
(1) According to the dyeable 1.74 resin lens of the present invention, a layer of dyeable 1.60plus resin lens is attached to a surface of a 1.74 lens, dyeing performance is good, a visible light transmittance can reach 10-30%, and the blank that the 1.74 lens cannot be dyed is filled.
(2) The curved degree and thickness of the dyeable layer are limited in the present invention, so that optical performance such as diopter of the lens is not influenced, and at the same time, problems such as grinding through of the lens in subsequent processing are solved.
(3) The dyeable layer and the module layer are combined by a pouring method in the present invention, the adhesion performance of the lens is good, the optical performance of the lens is not influenced, the surface of the 1.74 module layer is subjected to alkali treatment, the adhesion of two lens layers is further enhanced, and a curing process is combined to avoid dyeing layer falling.
(4) A preparation process of the present invention is simple, and is easy to implement, the price is low, and the popularization is easy.

DETAILED DESCRIPTION

Hereinafter, exemplary implementations of the present invention will be described in more detail with reference to specific embodiments.

The followings are raw materials and auxiliaries used in the embodiments:
raw materials of a 1.74 module layer and a 1.60 dyeable layer were from Mitsui Co., Ltd. in Japan;
N,N-diethylmethylamine and N,N-dimethylcyclohexylamine were from Shanghai Lianshuo Biological Technology Co., Ltd.;
an ultraviolet absorber was from Shanghai King Brother Chem Co., Ltd.;
blue and red color agents were from Haohai Chemical Co., Ltd. in Dongguan; and
dimethyltin dichloride was from Tianjin Zhongxin Chemtech Co., Ltd.

Example 1

A dyeable 1.74 resin lens included a module layer with a refractive index being 1.74. A dyeable layer with a refractive index being 1.60 was poured on an upper surface of the module layer. An upward curved degree of the dyeable layer was the same as an upward curved degree of the module layer. A center thickness of the dyeable layer was 0.8 mm.

A preparation method of the dyeable 1.74 resin lens of the present embodiment included the following steps:
(1) A module layer resin lens with a refractive index being 1.74 was prepared.
Raw materials of the module layer resin lens included: 100 g of bis(2,3-epithiopropyl)disulfide, 10 g of bis(mercaptomethyl)-3,6,9-trithiaundecan-1,11-dithiol, 0.02 g of an initiator of N,N-diethylmethylamine, 0.06 g of N,N-dimethylcyclohexylamine, 0.2 g of an ultraviolet absorber of 2-(2H-benzotriazole-2-yl)-6-(1-methyl-1-phenylethyl)-4-(1,1,3,3-tetramethylbutyl)phenol, 0.002 g of a blue color agent and 0.014 g of a red color agent.
Curing curves in the preparation process were as follows:
Primary curing: heat insulation was performed at 18° C. for 15 h. The temperature was raised to 30° C. in 1 h, and heat insulation was performed for 3 h. The temperature was raised to 110° C. in 8-10 h, heat insulation was performed for 2 h, and cooling was performed to reach 40° C. in 1.5 h. A speed was constant in the temperature raising and lowering processes.
Secondary curing: heat insulation was performed at 120° C. for 3 h.
(2) The prepared module layer was subjected to soaking treatment in a NaOH solution with a specific weight of 1.15 for 10 min at a treatment temperature of 75° C. Ultrasonic treatment was performed during soaking, and an ultrasonic wave intensity was 10 w/cm². Then, cleaning and drying were performed.
(3) The treated module layer was used as a lower mold, and a glass mold was used as an upper mold to perform mold closing.
(4) Raw materials of the dyeable layer with the refractive index being 1.60 were injected into the mold subjected to mold closing, and then curing was performed to obtain the dyeable resin lens.
The raw materials of the dyeable layer included: 30 g of 100 weight parts of a resin monomer of 2,5 (or 2,6)-bis(isocyanatomethyl)-bicyclo[2.2.1]heptane, 20 g of hexamethylene diisocyanate, 27 g of pentaerythritol tetra(3-mercaptopropionate), 23 g of 4-mercaptomethyl-3,6-dithia-1,8-octanedithiol, 0.06 g of an initiator of dimethyltin dichloride and 0.03 g of an ultraviolet absorber of 2-(2'-hydroxy-5'-tert-octylphenyl)benzotriazole.
Curing curves in this step were as follows:
Primary curing: heat insulation was performed at 20° C. for 4 h. The temperature was raised to 60° C. in 5 h. The temperature was raised to 90° C. in 3 h, and the temperature was raised to 100° C. in 0.5 h. The temperature was raised to 120° C. in 1 h, heat insulation was performed for 4 h, and cooling was performed to reach 80° C. in 1 h. A speed was constant in the temperature raising and lowering processes.
Secondary curing: heat insulation was performed at 120° C. for 2 h.
After the above preparation was completed, a pigment proportion ratio in a dyeing tank was adjusted according to the color of a final sample lens of a dyed lens, the above lens was dyed, a dyeing temperature was 85° C., and soaking time was 1 h. Then, color fixation was performed, a color fixation temperature was 90° C., and maintenance time was 3.5 h.

Example 2

A dyeable 1.74 resin lens included a module layer with a refractive index being 1.74. A dyeable layer with a refractive index being 1.60 was poured on an upper surface of the module layer. An upward curved degree of the dyeable layer was the same as an upward curved degree of the module layer. A center thickness of the dyeable layer was 1.0 mm.

A preparation method of the dyeable 1.74 resin lens of the present embodiment included the following steps:
(1) A module layer resin lens with a refractive index being 1.74 was prepared.
Raw materials of the module layer resin lens included: 100 g of bis(2,3-epithiopropyl)disulfide, 10 g of bis(mercaptomethyl)-3,6,9-trithiaundecan-1,11-dithiol, 0.03 g of an initiator of N,N-diethylmethylamine, 0.07 g of N,N-dimethylcyclohexylamine, 0.3 g of an ultraviolet absorber of 2'-(2'-hydroxy-3'-tert-butyl-5'-methylphenyl)-5-chlorobenzotriazole, 0.002 g of a blue color agent and 0.014 g of a red color agent.

Curing curves in the preparation process were as follows:

Primary curing: heat insulation was performed at 15° C. for 12 h. The temperature was raised to 30° C. in 1 h, and heat insulation was performed for 5 h. The temperature was raised to 110° C. in 10 h, heat insulation was performed for 2 h, and cooling was performed to reach 40° C. in 1.5 h. A speed was constant in the temperature raising and lowering processes.

Secondary curing: heat insulation was performed at 120° C. for 3 h.

(2) The prepared module layer was subjected to soaking treatment in a NaOH solution with a specific weight of 1.2 for 12 min at a treatment temperature of 70° C. Ultrasonic treatment was performed during soaking, and an ultrasonic wave intensity was 8 w/cm². Then, cleaning and drying were performed.

(3) The treated module layer was used as a lower mold, and a glass mold was used as an upper mold to perform mold closing.

(4) Raw materials of the dyeable layer with the refractive index being 1.60 were injected into the mold subjected to mold closing, and then curing was performed to obtain the dyeable resin lens.

The raw materials of the dyeable layer included: 30 g of a resin monomer of 2,5 (or 2,6)-bis(isocyanatomethyl)-bicyclo[2.2.1]heptane, 20 g of hexamethylene diisocyanate, 27 g of pentaerythritol tetra(3-mercaptopropionate), 23 g of 4-mercaptomethyl-3,6-dithia-1,8-octanedithiol, 0.05 g of an initiator of dimethyltin dichloride, and 0.02 g of an ultraviolet absorber of 2'-(2'-hydroxy-3'-tert-butyl-5'-methylphenyl)-5-chlorobenzotriazole.

Curing curves in this step were as follows:

Primary curing: heat insulation was performed at 22° C. for 5 h. The temperature was raised to 60° C. in 6 h. The temperature was raised to 90° C. in 4 h, and the temperature was raised to 100° C. in 0.5 h. The temperature was raised to 120° C. in 2 h, heat insulation was performed for 5 h, and cooling was performed to reach 80° C. in 1 h. A speed was constant in the temperature raising and lowering processes.

Secondary curing: heat insulation was performed at 120° C. for 2 h.

After the above preparation was completed, a pigment proportion ratio in a dyeing tank was adjusted according to the color of a final sample lens of a dyed lens, the above lens was dyed, a dyeing temperature was 95° C., and soaking time was 1.5 h. Then, color fixation was performed, a color fixation temperature was 100° C., and maintenance time was 3.5 h.

Example 3

A dyeable 1.74 resin lens included a module layer with a refractive index being 1.74. A dyeable layer with a refractive index being 1.60 was poured on an upper surface of the module layer. An upward curved degree of the dyeable layer was the same as an upward curved degree of the module layer. A center thickness of the dyeable layer was 1.2 mm.

A preparation method of the dyeable 1.74 resin lens of the present embodiment included the following steps:

(1) A module layer resin lens with a refractive index being 1.74 was prepared.

Raw materials of the module layer resin lens included: 100 g of bis(2,3-epithiopropyl)disulfide, 10 g of bis(mercaptomethyl)-3,6,9-trithiaundecan-1,11-dithiol, 0.01 g of an initiator of N,N-diethylmethylamine, 0.05 g of N,N-dimethylcyclohexylamine, 0.25 g of an ultraviolet absorber of 2-(2'-hydroxy-5'-tert-octylphenyl)benzotriazole, 0.002 g of a blue color agent and 0.014 g of a red color agent.

Curing curves in the preparation process were as follows:

Primary curing: heat insulation was performed at 16° C. for 10 h. The temperature was raised to 30° C. in 1 h, and heat insulation was performed for 4 h. The temperature was raised to 110° C. in 9 h, heat insulation was performed for 2 h, and cooling was performed to reach 40° C. in 1.5 h. A speed was constant in the temperature raising and lowering processes.

Secondary curing: heat insulation was performed at 120° C. for 3 h.

(2) The prepared module layer was subjected to soaking treatment in a NaOH solution with a specific weight of 1.25 for 10 min at a treatment temperature of 65° C. Ultrasonic treatment was performed during soaking, and an ultrasonic wave intensity was 15 w/cm². Then, cleaning and drying were performed.

(3) The treated module layer was used as a lower mold, and a glass mold was used as an upper mold to perform mold closing.

(4) Raw materials of the dyeable layer with the refractive index being 1.60 were injected into the mold subjected to mold closing, and then curing was performed to obtain the dyeable resin lens.

The raw materials of the dyeable layer included: 30 g of 100 weight parts of resin monomers of 2,5 (or 2,6)-bis(isocyanatomethyl)-bicyclo[2.2.1]heptane, 20 g of hexamethylene diisocyanate, 27 g of pentaerythritol tetra(3-mercaptopropionate), 23 g of 4-mercaptomethyl-3,6-dithia-1,8-octanedithiol, 0.04 g of an initiator of dimethyltin dichloride, and 0.03 g of an ultraviolet absorber of 2-(2H-benzotriazole-2-yl)-6-(1-methyl-1-phenylethyl)-4-(1,1,3,3-tetramethylbutyl)phenol.

Curing curves in this step were as follows:

Primary curing: heat insulation was performed at 20° C. for 5 h. The temperature was raised to 60° C. in 6 h. The temperature was raised to 90° C. in 4 h, and the temperature was raised to 100° C. in 0.5 h. The temperature was raised to 120° C. in 1 h, heat insulation was performed for 4 h, and cooling was performed to reach 80° C. in 1 h. A speed was constant in the temperature raising and lowering processes.

Secondary curing: heat insulation was performed at 120° C. for 2 h.

After the above preparation was completed, a pigment proportion ratio in a dyeing tank was adjusted according to the color of a final sample lens of a dyed lens, the above lens was dyed, a dyeing temperature was 90° C., and soaking time was 1 h. Then, color fixation was performed, a color fixation temperature was 120° C., and maintenance time was 3.5 h.

Comparative Example 1

An existing resin lens with a refractive index being 1.74.

Comparative Example 2

A dyeable 1.74 resin lens was prepared according to the method of Embodiment 1, wherein a center thickness of a dyeable layer was 1.5 mm, and other steps were identical.

Comparative Example 3

A dyeable 1.74 resin lens was prepared according to the method of Embodiment 1, wherein an upward curved degree of a dyeable layer was different from that of a module layer.

Comparative Example 4

A dyeable 1.74 resin lens was prepared according to the method of Embodiment 1, wherein a module layer was not subjected to alkali treatment, and other steps were identical.

Comparative Example 5

A dyeable 1.74 resin lens was prepared according to the method of Embodiment 1, wherein the resin lens layer with a refractive index being 1.60 was prepared from a conventional 1.60 acrylic resin lens as a raw material.

Lenses of the above embodiments and comparative examples were respectively subjected to dyeing test and adhesion test, and the results were as shown in Table 1.

TABLE 1

Performance comparison of lenses of embodiments and comparative examples

| Sample | Adhesion test | Dyeing depth (visible light transmittance) | Processing process problem |
|---|---|---|---|
| Example 1 | Qualified | 15.5% | OK |
| Example 2 | Qualified | 16.3% | OK |
| Example 3 | Qualified | 14.6% | OK |
| Comparative Example 1: | — | Dyeing incapability | — |
| Comparative Example 2: | Qualified | 17.2% | 1.74 layer worn, wrong diopter |
| Comparative Example 3: | Qualified | 16.3% | Wrong diopter |
| Comparative Example 4: | Unqualified | 15.3% | OK |
| Comparative Example 5: | Unqualified | Dyeing incapability | OK |

Note:
A visible light transmittance test instrument was TM-3, adhesion test adopted pure water boiling for 30 min to test whether falling occurs or not; and the processing process problem referred to whether a worn condition, diopter inaccuracy and the like existed or not.

From the above table, the dyeing effect of the dyeable 1.74 resin lens prepared by the present invention is good, the adhesion between the dyeable layer and the module layer is good, falling cannot easily occur, the lens diopter is not influenced, and the subsequent processing is not influenced.

Each embodiment of the present invention has been described above, and the foregoing description is illustrative, not exhaustive, and is not limited to the disclosed embodiments. Many modifications and variations will be apparent to those skilled in the art without departing from the scope and technical principles of the described embodiments, and such modifications and variations should also be regarded to be within the protection scope of the present invention.

What is claimed is:

1. A preparation method of a dyeable 1.74-resin lens comprising the following steps:
    (1) preparing a module layer resin lens with a refractive index being 1.74;
        wherein the module layer with the refractive index being 1.74 is created by the following ingredients:
        100 weight parts of a resin monomer A material, 10 weight parts of a resin monomer B material, 0.06-0.11 weight part of an initiator, 0.2-0.3 weight part of an ultraviolet absorber, 0.002 weight part of a blue color agent and 0.014 weight part of a red color agent, wherein the resin monomer A material is bis(2,3-epithiopropyl)disulfide, and the resin monomer B material is bis(mercaptomethyl)-3,6,9-trithiaundecan-1,11-dithiol;
    (2) soaking the prepared module layer in a NaOH solution for surface treatment, and then performing cleaning and drying;
        wherein the prepared module layer is soaked in the NaOH solution for 10-12 min at a temperature of 65-75° C. while an ultrasonic wave intensity at 5-15 w/cm² is performed, the ratio of the prepared module layer to the NaOH solution is 1.15-1.25 to 1 by weight;
    (3) using the treated module layer as a lower mold and a glass mold as an upper mold to perform mold closing; and
    (4) injecting raw materials of the dyeable layer with the refractive index being 1.60 into the mold subjected to mold closing, and then performing curing to obtain the dyeable resin lens.

2. The preparation method of the dyeable 1.74-resin lens according to claim 1, wherein the initiator is a mixture of N,N-diethylmethylamine and N,N-dimethylcyclohexylamine, and a mass ratio is 0.01-0.03:0.05-0.08.

3. The preparation method of the dyeable 1.74-resin lens according to claim 1,
    wherein curing curves in the preparation of the module layer resin lens are as follows:
    primary curing: performing heat insulation at 15-18° C. for 10-15 h; raising the temperature to 30° C. in 1 h, and performing heat insulation for 3-5 h; and raising the temperature to 110° C. in 8-10 h, performing heat insulation for 2 h, and performing cooling to reach 40° C. in 1.5 h; and
    secondary curing: performing heat insulation at 120° C. for 3 h.

4. The preparation method of the dyeable 1.74-resin lens according to claim 1, wherein the dyeable layer with the refractive index being 1.60 comprises the following ingredients:
    100 weight parts of resin monomers, 0.03-0.06 weight part of an initiator and 0.01-0.03 weight part of an ultraviolet absorber, wherein the resin monomer is a mixture of 2,5 (or 2,6)-bis(isocyanatomethyl)-bicyclo[2.2.1]heptane, hexamethylene diisocyanate, pentaerythritol tetra(3-mercaptopropionate) and 4-mercaptomethyl-3,6-dithia-1,8-octanedithiol, and a mass ratio is 30:20:27:23.

5. The preparation method of the dyeable 1.74-resin lens according to claim 1, wherein a specific weight of the NaOH solution in step (2) is 1.15-1.25, the soaking time is 3-15 min, the temperature is 60-80° C., ultrasonic treatment is performed during soaking, and an ultrasonic wave intensity is 5-15 w/cm².

6. The preparation method of the dyeable 1.74-resin lens according to claim 1, wherein curing curves of curing in step (4) are as follows:
    primary curing: performing heat insulation at 20-22° C. for 4-5 h; raising the temperature to 60° C. in 5-6 h; raising the temperature to 90° C. in 3-4 h, and raising the temperature to 100° C. in 0.5 h; and raising the temperature to 120° C. in 1-2 h, performing heat insulation for 4-5 h, and performing cooling to reach 80° C. in 1 h; and
    secondary curing: performing heat insulation at 120° C. for 2 h.

* * * * *